United States Patent [19]
Whidden

[11] 3,943,428
[45] Mar. 9, 1976

[54] DC TO DC VOLTAGE CONVERTER
[75] Inventor: James R. Whidden, Baldwinsville, N.Y.
[73] Assignee: General Electric Company, Syracuse, N.Y.
[22] Filed: Dec. 13, 1974
[21] Appl. No.: 532,367

Related U.S. Application Data
[63] Continuation-in-part of Ser. No. 418,236, Nov. 23, 1973, abandoned.

[52] U.S. Cl. .................. 321/15; 320/1; 307/111
[51] Int. Cl.² .......................................... H02M 7/00
[58] Field of Search ............... 307/1, 2, 110; 320/1; 321/2, 15

[56] References Cited
UNITED STATES PATENTS

| | | | |
|---|---|---|---|
| 3,240,958 | 3/1966 | Kerios et al. | 307/110 |
| 3,432,738 | 3/1969 | Jensen | 321/15 |
| 3,478,258 | 11/1969 | Nagai | 321/15 |
| 3,820,004 | 6/1974 | Sugiura et al. | 321/15 |
| 3,821,627 | 6/1974 | Milovancevic | 321/2 |
| 3,824,447 | 7/1974 | Kuwabara | 321/15 |

OTHER PUBLICATIONS
Electronic Design, "Transformerless Voltage Doubler has Good Output Regulation," Vol. 26, p. 64, Dec. 21, 1972.
Scientific & Technical Aerospace Reports(Star), Issue No. 9, p. 1430, Figure 14, May 8, 1965.

Primary Examiner—William M. Shoop

[57] ABSTRACT
A DC voltage source of amplitude below the DC voltage requirement of a load to be energized drives a pair of complementary transistors which are alternately turned on and off to apply supply voltage alternately to each of two capacitors connected in series. The sum voltage of the two capacitors is applied, in one embodiment, directly to a voltage regulator and filtered and, in another embodiment, is added to the DC source voltage prior to being regulated and filtered. The converter output is capacitively coupled to the DC supply voltage, thus furnishing a common AC connection.

14 Claims, 2 Drawing Figures

3,943,428

DC TO DC VOLTAGE CONVERTER

This is a continuation-in-part of application Ser. No. 418,236 filed Nov. 23, 1973, and now abandoned.

INTRODUCTION

This invention relates to DC voltage amplitude converters, and more particularly to DC voltage doublers and triplers having well-regulated output voltage.

Portable battery-operated devices, of which many types are commonly used throughout the world, have never been standardized to operate from a single power supply voltage. Different types of apparatus usually require different power supply voltage levels, and different manufacturers of similar apparatus frequently establish different power supply voltage levels for their products.

Often the need to employ a power supply of higher voltage level may be met by increasing the total number of battery cells to be used with the product. Since the cells that are used in portable devices requiring sufficient current to drive a motor are usually rated at 1.5 volts each, the number of cells required to furnish rated DC voltage to some portable battery-operated devices may become so great as to detract from the portability or small size of the device. It is under such circumstances that DC to DC voltage converters may advantageously be incorporated into these devices to step up the DC level furnished by the power supply without requiring additional battery cells.

Because some portable battery-operated devices require rather precise levels of voltage for proper operation, it heretofore has often been unfeasible to employ converters in such apparatus because of their inadequate voltage regulation characterisics. The present invention, however, is directed to a DC to DC voltage converter which exhibits close regulation of its output voltage.

Accordingly, one object of the invention is to provide a DC to DC voltage converter that maintains a well-regulated level of output voltage.

Another object is to provide a DC voltage doubler capable of conducting alternating current between the voltage source and the load.

Another object is to provide a DC voltage tripler capable of conducting alternating current between the voltage source and the load.

Another object is to provide a transformless DC to DC converter empoying complementary transistors to charge each one of a pair of capacitors in alternate manner.

Briefly, in accordance with a preferred embodiment of the invention, a DC to DC voltage converter comprises pulse generator means, and gating means coupled to the pulse generator means. First and second charge storage means are coupled to the gating means. The gating means furnishes a current path to the first charge storage means in response to a positive-going change in voltage produced by the pulse generator means and furnishes a current path to the second charge storage means in response to a negative-going change in voltage produced by the pulse generator means. Output circuit means are connected in series with the first and second charge storage means, the first and second charge storage means being connected in series-aiding relationship.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

DESCRIPTION OF TYPICAL EMBODIMENTS

Figure 1:
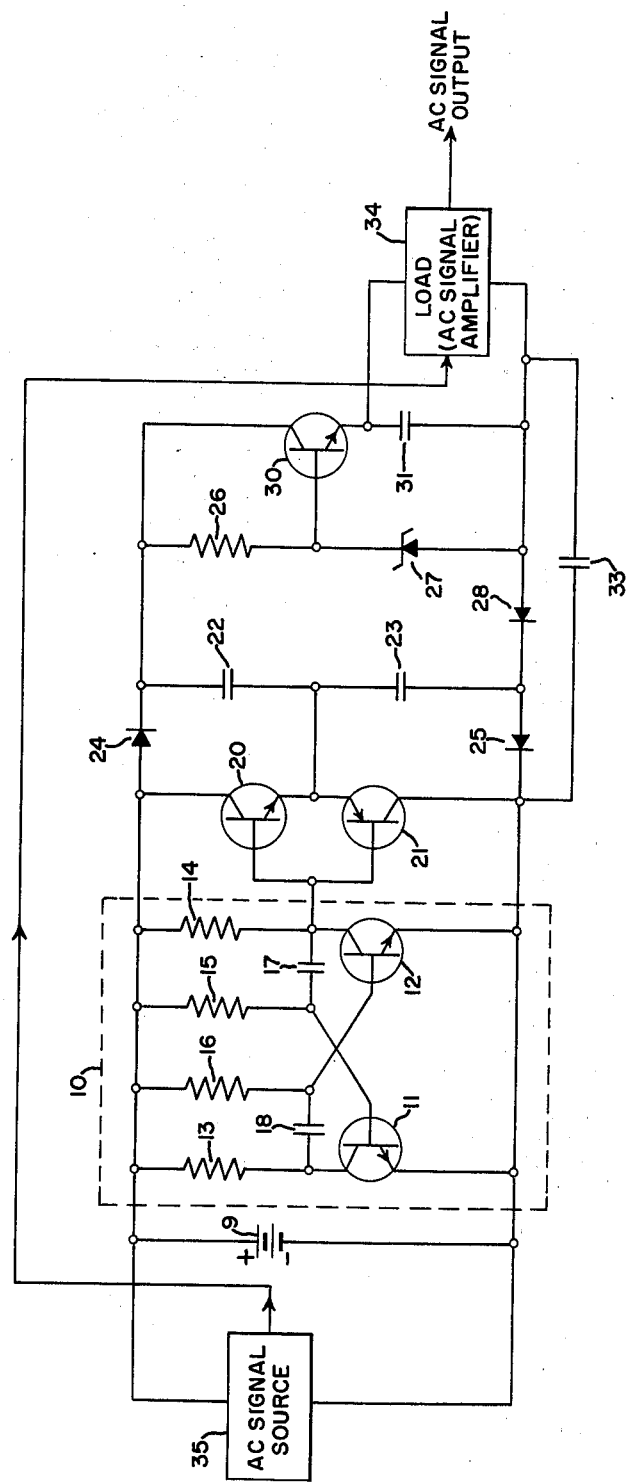
FIG. 1 is a schematic diagram of one embodiment of a DC to Dc voltage converter constructed in accordance with the instant invention.

FIG. 1 illustrates a DC to DC voltage converter including an astable multivibrator 10 of conventional configuration. Thus the multivibrator comprises first and second active elements 11 and 12 respectively, such as NPN transistors, each with its emitter electrode connected to the negative side of a power supply 9, its collector electrode connected through a load resistance 13 and 14, respectively, to the positive side of the power supply, and its base electrode connected through a bias resistance 15 and 16, respectively, to the positive side of the power supply. In addition, a coupling capacitor 17 is connected between the collector of transistor 12 and the junction of the base of transistor 11 and resisttance 15, and a coupling capacitor 18 is connected between the collector of transistor 11 and the junction of the base of transistor 12 and resistance 16. An AC signal source 35 may be connected so as to be energized by power supply 9.

The collector of transistor 12, representing the output of multivibrator 10, is connected to the base electrode of each of transistors 20 and 21. Transistors 20 and 21 are of complementary configuration, transistor 20 being of the NPN type and transistor 21 being of the PNP type. The collector electrode of transistor 20 is connected to the positive side of power supply 9 while the collector electrode of transistor 21 is connected to the negative side of the power supply. The emitter electrodes of transistors 20 and 21 are connected in common to one side of each of a pair of capacitances 22 and 23. A diode 24 is connected in the forward-biased direction between the collector of transistor 20 and the other side of capacitance 22, while a diode 25 is connected in the forward-biased direction between the collector of transistor 21 and the other side of capacitance 23.

Connected in series across the series combination of capacitances 22 and 23 are a resistance 26, a zener diode 27, and a diode 28, the cathode of diode 28 being connected to the anode of diode 25 and the anode of diode 28 being connected to the anode of zener diode 27. The base electrode of an NPN transistor 30 is connected to the junction of resistance 26 and the cathode of zener diode 27, while the collector electrode of transistor 30 is connected to the cathode of diode 24. A filter capacitance 31 is connected between the emitter electrode of transistor 30 and the junction of the anodes of diodes 27 and 28. DC output vltage is provided across capacitance 31 from transistor 30, operated in an emitter follower configuration, to a load 34. If load 34 is a signal processor, such as an AC signal amplifier energized by the voltage across capacitance 31, output signals from AC signal source 35 are supplied to the input of amplifier 34. A coupling capacitance 33 is connected between the cathode of diode 25 and the anode of diode 28.

During operation of the DC to DC converter of FIG. 1, multivibrator 10 produces pulses at the collector of transistor 12 in a well-known manner. Assuming transistor 11 is nonconductive and transistor 12 is conductive at any given instant of time, the collector-to-emitter voltage on transistor 12 is approximately zero and the collector-to-emitter voltage on transistor 11 is approximately equal to the voltage of power supply 9. Under these conditions, collector current drawn by transistor 12 causes current to flow through resistances 14 and 15, in turn causing a charge buildup on capacitance 17 tending to bias the base of transistor 11 positive.

When capacitance 17 has charged through resistance 15 to a sufficiently high voltage, transistor 11 becomes conductive and draws collector current through resistances 13 and 16. Base voltage on transistor 12 thus drops to a low value, switching the transistor into its nonconductive condition. Collector voltage thereupon rises sharply on transistor 12, producing a positive-going voltage thereon. Subsequently, capacitance 18 acquires a charge tending to bias the base of transistor 12 positive.

When capacitance 18 has charged through resistance 16 to a sufficiently high voltage, transistor 12 again becomes conductive, drawing current through resistance 14 so that collector voltage abruptly drops to approximately zero. At that time, a negative-going voltage is produced on the collector of transistor 12, and transistor 11 is driven into nonconduction. These cycles repeatedly continue as long as multivibrator 10 remains energized, producing a series of positive pulses on the collector of transistor 12 of amplitude approximately equal to that of power supply 9.

Transistor 20 is rendered conductive whenever a positive voltage is applied to its base, while transistor 21 is rendered conductive whenever its base voltage is approximately zero. Conduction of transistor 20 causes current flow through capacitance 23 and diode 25, while conduction of transistor 21 causes current flow through capacitance 22 and diode 24. Thus it is evident that the voltages which build up across capacitances 22 and 23 are in series-aiding relationship. Moreover, the amplitude of voltage on each of capacitances 22 and 23 approaches that of the power supply due to the low series voltage drop across either of transistors 20 and 21, when in the conductive state, and the associated forward-biased diode 25 or 24, respectively. When capacitances 22 and 23 are charged so that their total voltage amplitude exceeds that of power supply 9, diodes 24 and 25 prevent them from discharging back to the power supply. Diodes 24 and 25 also prevent capacitances 22 and 23, respectively, from discharging through transistors 20 and 21, repsectively, when the transistor is in a conductive condition.

The total voltage across capacitances 22 and 23, which is approximately double the voltage of power supply 9, is applied across the series combination of resistance 26, zener diode 27, and forward-biased diode 28. The size of resistance 26 is selected to cause diode 27 to operate in its reverse breakdown state so as to maintain a constant voltage on the base of transistor 30 irrespective of the amount of current flow through resistance 26. Because the voltage across the base to emitter junction of a transistor is approximately constant when the transistor is energized, it follows that even though the resistance of load 34 may vary within a given range, the voltage across the load is maintained essentially constant in accordance with the base to emitter voltage on transistor 30 which remains essentially constant.

Filter capacitance 31, typically of the electrolytic type, serves to filter transient currents produced by multivibrator 10, from the output of the circuit. This keeps multivibrator-produced transient currents from adversely affecting operation of the load. Additionally, capacitance 31 filters pulses that would otherwise appear at the load as a result of repetitively charging and discharging capacitances 22 and 23.

Coupling capacitance 33 is preferably of relatively large size in order to produce a low impedance alternating current path between voltage source 9 and load 34 if and when desired, bypassing diodes 25 and 28. This AC path allows alternating current, separately applied directly to load 34 from AC signal source 35, to return to AC source 35 from the load. Capacitaance 31 filters pulses created by the on-and-off switching of diode 28, along with any transients associated with such pulses. Those skilled in the art will recognize that, as an alternative embodiment, an AC signal source may be substituted for load 34 and supply AC signals to a signal processing circuit substituted for AC signal source 35, where circumstances warrant.

Diode 28 prevents capacitance 33 from discharging therethrough when transistor 20 becomes conductive. This production occurs because, when transistor 21 becomes conductive, the cathode voltage of diode 25 remains unchanged, while the anode voltage on diode 25 and cathode voltage on diode 28 drops by an amount equal to the voltage across capacitance 23 (neglecting the collector-to-emitter voltage drop across transistor 21), which is almost equal to the voltage of power supply 9. Diode 25 is thus reverse-biased. At the same time, the anode voltage of diode 28 is driven negative as capacitance 33 acquires a charge caused by discharge of capacitance 23 through transistor 21 and diode 28 in series. When transistor 21 is next driven into nonconduction and transistor 20 into conduction, diode 24 becomes reverse-biased and the anode voltage on diode 25 and cathode voltage on diode 28 rises by an amount equal to the voltage across capacitance 22 (neglecting the collector-to-emitter voltage drop across transistor 20), which is almost equal to the voltage of power supply 9. Diode 25 is thus once again forward-biased. At the same time, the anode of diode 28 is maintained at a negative voltage by virtue of the charge acquired by capacitance 33 during the conduction interval of transistor 21. Thus diode 28 is maintained reverse-biased during the conduction interval of transistor 20 and thereby substantially prevents capacitance 33 from discharging therethrough during the conduction interval of transistor 20. Hence when transistor 21 is next driven into conduction, the voltage stored on capacitance 33 prevents any substantial discharge therethrough from capacitance 23, insuring that the voltage stored on capacitance 23 will remain sufficient high to drive the load with proper voltage amplitude at all times.

It should be noted that load 34 need not be responsive to signals from an AC signal source 35. In such case, AC signal source 35 is not employed, and there would be no need for capacitance 33, while a conductive connection would be substituted for diode 28.

Figure 2:
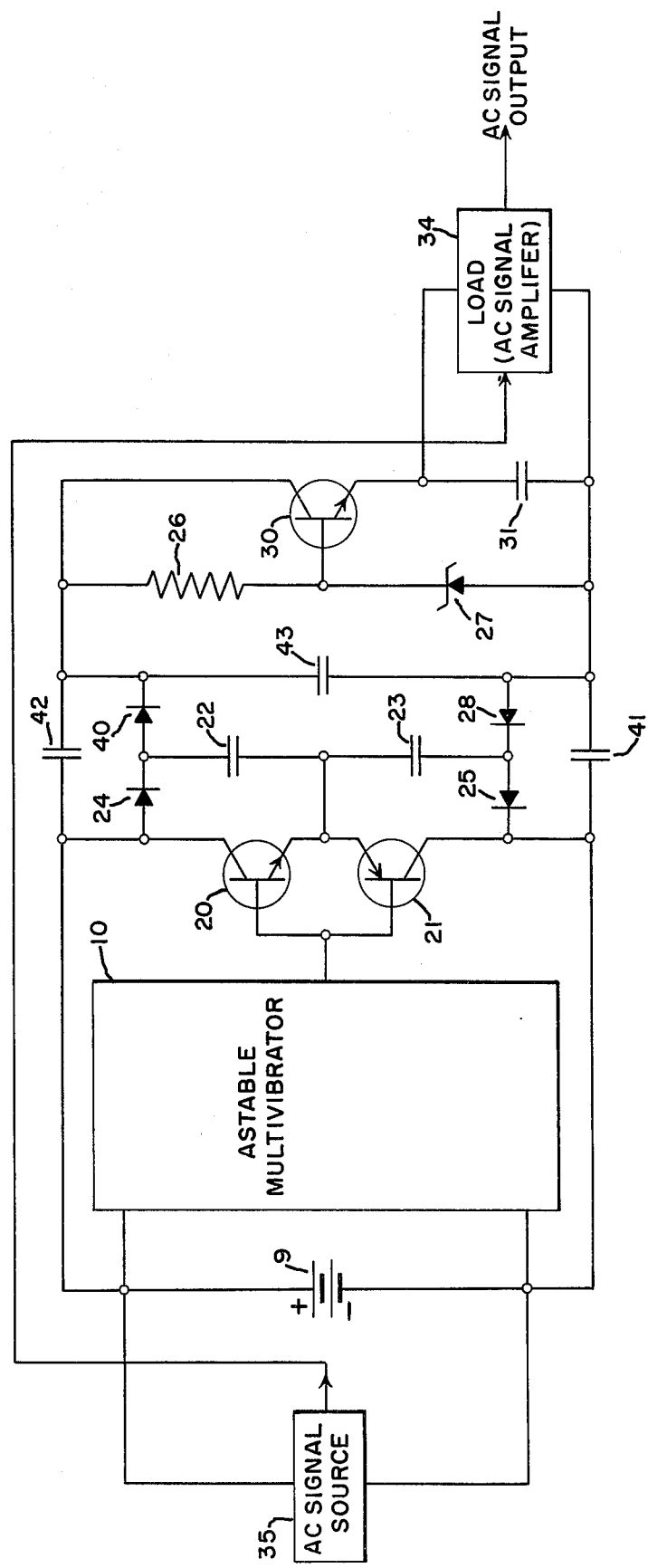
FIG. 2 is a schematic diagram of another embodiment of a DC to DC voltage converter constructed in accordance with the instant invention.

In the voltage converter of FIG. 2, astable multivibrator 10, of circuit configuration as illustrated in FIG. 1, is energized by power supply 9. AC signal source 35 may also be connected for energization by power supply 9.

The output of multivibrator 10 is connected to the base electrode of each of complementary transistors 20 and 21. The collector electrode of transistor 20 is connected to the positive side of power supply 9 while the collector electrode of transistor 21 is connected to the negative side of the power supply. The emitter electrodes of transistors 20 and 21 are connected in common to one side of each of capacitances 22 and 23. Diode 24 is connected in the forward-biased direction between the collector of transistor 20 and the other side of capacitance 22, while diode 25 is connected in the forward-biased direction between the collector of transistor 21 and the other side of capacitance 23. Thus far described, the circuitry of FIG. 2 is substantially identical to that of FIG. 1.

The cathode of diode 28 is connected to the anode of diode 25 as in the embodiment of FIG. 1, while the anode of a diode 40 is connected to the cathode of diode 24. A first storage capacitance 41 is connected between the anode of diode 28 and the cathode of diode 25, while a second storage capacitance 42 is connected between the anode of diode 24 and the cathode of diode 40. A third storage capacitance 43 is connected between the anode of diode 28 and the cathode of diode 40. Resistance 26 and zener diode 27 are connected in series between the anode of diode 28 and the cathode of diode 40, the anode of zener diode 27 being connected to the anode of diode 28. The base electrode of transistor 30 is connected to the junction of resistance 26 and the cathode of zener diode 27, while the collector electrode of transistor 30 is connected to the cathode of diode 40. Filter capacitance 31 is connected between the emitter electrode of transistor 30 and the anode of diode 28. DC output voltage is provided across capacitance 31 from transistor 30, operated in an emitter follower configuration, to load 34. Since load 34 is typically a signal processor, such as an AC signal amplifier energized by the voltage across capacitance 31, output signals from signal source 35 are supplied to the input of amplifier 34.

During operation of the DC to DC converter of FIG. 2, multivibrator 10 produces positive pulses as described in conjunction with the circuit of FIG. 1, NPN transistor 20 being rendered conductive whenever a positive voltage is applied to its base and PNP transistor 21 being rendered conductive whenever its base voltage is approximately zero. When transistor 21 becomes conductive, drawing collector-to-emitter current through diode 24 and capacitance 22 in series, the cathode voltage of diode 25 remains unchanged, while the anode voltage on diode 25 and cathode voltage on diode 28 drops by an amount equal to the voltage across capacitance 23 (neglecting the emitter-to-collector voltage drop across transistor 21), which is almost equal to the voltage of power supply 9. Diode 25 is thus reverse-biased. At the same time, the anode voltage of diode 28 is driven negative as capacitance 41 acquires a charge from capacitance 23 discharging through transistor 21 and diode 28 in series. In this fashion, capacitance 41 acquires a DC voltage substantially equal in amplitude to the voltage of power supply 9.

When transistor 21 is next driven into nonconduction and transistor 20 into conduction drawing emitter-to-collector current through capacitance 23 and diode 25 in series, diode 24 becomes reverse-biased since the anode voltage of diode 24 remains unchanged, while the cathode voltage on diode 24 and anode voltage on diode 40 is increased by an amount equal to the voltage across capacitance 22 (neglecting the collector-to-emitter voltage drop across transistor 20), which is almost equal to the voltage of power supply 9 after but a few cycles of operation of multivibrator 10. At the same time, the cathode voltage of diode 40 is driven positive as capacitance 42 acquires a charge from capacitance 22 discharging through transistor 20 and diode 40 in series. In this fashion, capacitance 42 acquires a DC voltage substantially equal in amplitude to the voltage of power supply 9.

When transistor 20 is again driven into nonconduction and transistor 21 into conduction, diode 25 again becomes reverse-biased and the cathode voltage on diode 24 and anode voltage on diode 40 drops by an amount equal to the voltage across capacitance 23 (neglecting the emitter-to-collector voltage drop across transistor 21), which is almost equal to the voltage of power supply 9. Diode 24 is thus once again forward-biased. Consequently, capacitance 43 becomes charged with a DC voltage equal to the sum of the voltages on capacitances 41 and 42 and the voltage of power supply 9, all of which are connected in series-aiding relationship, thereby reaching substantially three times the amplitude of voltage furnished by power supply 9. The polarity of voltage on capacitance 43 is such that diodes 40 and 28 prevent discharge through capacitances 22 and 23, respectively, and, in conjunction with diodes 24 and 25, respectively, also prevent discharge of capacitance 43 back through power supply 9.

The tripled voltage of power supply 9, appearing across capacitance 43, is applied across the series combination of resistance 26 and zener diode 27. The size of resistance 26 is selected to cause diode 27 to operate in its reverse breakdown state so as to maintain a constant voltage on the base of transistor 30 irrespective of the amount of current flow through resistance 26. Because the voltage across the base to emitter junction of transistor 30 is thus approximately constant, the voltage across load 34 is maintained essentially constant.

Filter capacitance 31 serves to filter transient currents produced by multivibrator 10, from the output of the circuit so as to keep such currents from adversely affecting operation of the load. Capacitance 31 also filters pulse that would otherwise appear at the load as a result of repetitively charging and discharging capacitances 22 and 23 and storage capacitances 41, 42 and 43, including pulses created by the on-and-off switching of diodes 28 and 40 along with any transients associated with such pulses.

Storage capacitances 41 and 42 are preferably of relatively large size in order to produce a low impedance alternating current path between voltage source 9 and load 34 if and when desired, bypassing diodes 25 and 28. This AC path allows alternating current, separately applied directly to load 34 from AC signal source 35, to return to AC source 35 from the load. Storage capacitance 43 adds filtering to the circuit. As an alternative embodiment, an AC signal source may be substituted for load 34 and supply AC signals to a signal processing circuit substituted for AC signal source 35, where circumstances warrant.

When diode 25 is forward-biased during conduction of transistor 20, the anode of diode 28 is maintained at a negative potential by virtue of the charge previously acquired by capacitance 41 during the conduction interval of transistor 21. Thus diode 28 is maintained reverse-biased during the conduction interval of transistor 20. When transistor 21 is next driven into conduction, the voltage stored on capacitance 41 prevents any appreciable discharge therethrough from capacitance 23, insuring that the voltage stored on capacitance 23 will remain sufficiently high to maintain proper voltage amplitude at all times on capacitance 41. Similarly, when diode 24 is forward-biased, the cathode of diode 40 is maintained at a positive potential by virtue of the charge previously acquired by capacitance 42 during the conduction interval of transistor 20. Thus diode 40 is maintained reverse-biased during the conduction interval of transistor 21. When transistor 20 is next driven into conduction, the voltage stored on capacitance 42 prevents any appreciable discharge therethrough from capacitance 22, insuring that the voltage stored on capacitance 22 will remain sufficiently high to maintain proper voltage amplitude at all times on capacitance 42. Thus the voltage stored across capacitances 22 and 23 in series is not directly applied to the load since diodes 40 and 28 conduct on alternate half cycles, respectively, of the multivibrator output voltage.

The foregoing describes a DC to DC voltage converter that maintains a well-regulated level of output voltage. The converter, which may be operated as either a doubler or tripler of DC voltage, capable of conducting alternating current between the voltage source and the load, is transformerless and employs complementary transistors to charge each one of a pair of capacitances in alternate manner.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. A DC to DC voltage converter for use with a load which is also responsive to an AC source comprising:
   pulse generator means;
   gating means coupled to said pulse generator means;
   first and second charge storage means coupled to said gating means, said gating means furnishing a current path to said first charge storage means in response to a positive-going change in voltage produced by said pulse generator means and furnishing a current path to said second charge storage means in response to a negative-going change in voltage produced by said pulse generator means;
   output circuit means connected in series with said first and second charge storage means, said output circuit means including voltage regulator means, said first and second charge storage means being connected in series-aiding relationship;
   capacitance means coupling said output circuit means to said pulse generating means; and
   unidirectional conducting means coupling said first charge storage means to said voltage regulator means and poled so as to be reverse-biased each time said gating means furnishes a current path to said first charge storage means and thereby prevent said capacitance means from discharging through said unidirectional conducting means at said time.

2. The apparatus of claim 1 wherein said gating means comprises first and second transistors each having a base electrode, an emitter electrode, and a collector electrode, each of said collector electrodes being coupled to one side of each of said first and second charge storage means, respectively, each of said base electrodes being connected to said pulse generator means, and each of said emitter electrodes being connected in common to the other side of each of said first and second charge storage means.

3. The apparatus of claim 2 wherein said pulse generator means comprises an astable multivibrator having first and second active elements, and first transistor being rendered conuctive and said second transistor nonconductive in response to a rise in voltage across said first active element and said second transistor being rendered conductive and first transistor nonconductive in response to a rise in voltage across said second active element.

4. The apparatus of claim 2 wherein said first and second transistors are of complementary configuration and said base electrodes are connected in common.

5. The apparatus of claim 3 wherein said first and second transistors are of complementary configuration and each of said base electrodes is connected to said first active element.

6. A converter for increasing voltage amplitude furnished from a DC power supply, said converter comprising:
   pulse generator means;
   gating means coupled to said pulse generator means;
   first and second charge storage means coupled to said gating means, said gating means furnishing a charging current path to said first charge storage means in response to a change in voltage of one polarity direction produced by said pulse generator means and furnishing a charging current path to said second charge storage means in response to a change in voltage of opposite polarity direction produced by said pulse generator means;
   third charge storage means coupled to said gating means, said gating means furnishing a current path from said first charge storage means to said third charge storage means in response to said change in voltage of opposite polarity direction produced by said pulse generator means; and
   output circuit means connected in series with said third charge storage means, said third charge storage means being connected in series-aiding relationship with said power supply.

7. The apparatus of claim 6 wherein said output circuit means includes voltage regulator means.

8. The apparatus of claim 6 wherein said gating means comprises first and second transistors each having a base electrode, an emitter electrode, and a collector electrode, each of said collector electrodes being coupled to one side of each of said first and second charge storage means, respectively, each of said base electrodes being connected to said pulse generator means, and each of said emitter electrodes being connected in common to the other side of each of said first and second charge storage means.

9. The apparatus of claim 6 including fourth charge storage means coupled to said gating means, said gating means further furnishing a current path from said second charge storage means to said fourth charge storage means in response to said change in voltage of one polarity direction produced by said pulse generator means, said fourth charge storage means being connected in series with said output circuit means and in series-aiding relationship with said power supply and said third charge storage means.

10. The apparatus of claim 9 wherein said output circuit means includes voltage regulator means.

11. The apparatus of claim 9 wherein said gating means comprises first and second transistors each having a base electrode, an emitter electrode, and a collector electrode, each of said collector electrodes being coupled to one side of each of said first and second charge storage means, respectively, each of said base electrodes being connected to said pulse generator means, and each of said emitter electrodes being connected in common to the other side of each of said first and second charge storage means.

12. The apparatus of claim 9 including fifth charge storage means connected in parallel with said output circuit means.

13. The apparatus of claim 10 including fifth charge storage means connected in parallel with said output circuit means.

14. The aparatus of claim 11 including fifth charge storage means connected in parallel with said output circuit means.

* * * * *